Jan. 5, 1960    J. A. PATTERSON ET AL    2,919,887
COMBINATION HIGH AND LOW PRESSURE VALVE
Filed April 15, 1958

INVENTORS
Joseph A. Patterson
Walter A. Bruce.

United States Patent Office 2,919,887
Patented Jan. 5, 1960

2,919,887

COMBINATION HIGH AND LOW PRESSURE VALVE

Joseph A. Patterson, Brave, and Walter A. Bruce, Waynesburg, Pa.

Application April 15, 1958, Serial No. 728,722

1 Claim. (Cl. 251—189)

This invention relates to fluid control apparatus and more particularly to a fluid pressure valve.

It is an object of the present invention to provide a valve assembly for various types of fluid pressure control systems that can be used for both high and low pressure systems without any substantial change in the manner of operation thereof.

Another object of the present invention is to provide a combined valve of the above type that is positively acting, manually controlled, and accurately adjustable so as to provide a proper amount of flow therethrough.

Other objects of the invention are to provide a combination high and low pressure valve bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
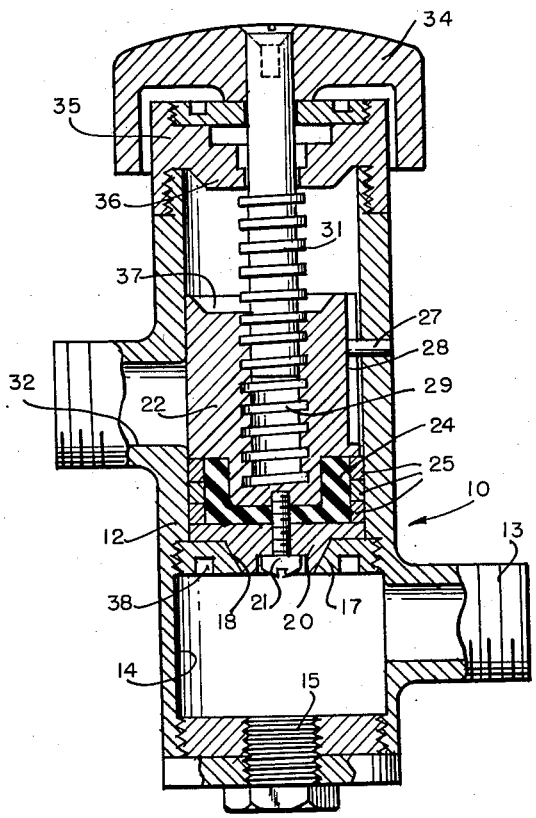
Figure 1 is a longitudinal cross sectional view of a valve made in accordance with the present invention in operative use.
Figure 2:
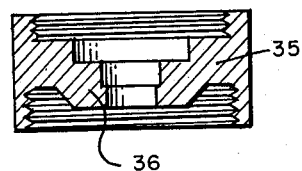
Figure 2 is a longitudinal cross sectional view of one of the parts of the present invention.
Figure 3:
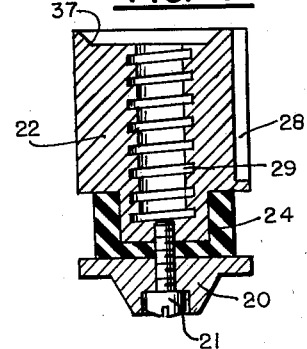
Figure 3 is a longitudinal cross sectional view of another part of the present invention.
Figure 4:
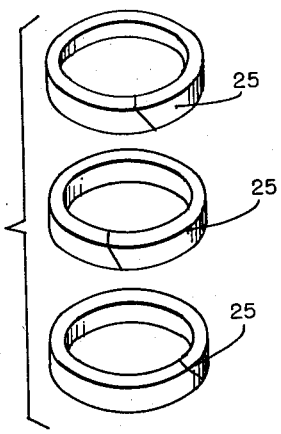
Figure 4 is an exploded perspective view of still other parts of the present invention.

Referring now more in detail to the drawing, a combination high and low pressure valve assembly 10 made in accordance with the present invention is shown to include an exterior casing 12 having an inlet 13 at the lower end in communication with a lower chamber 14. A removable clean-out plug 15 which communicates with the lower chamber 14 provides means for facilitating the cleaning and maintenance of the valve. A removable plate 17 is threadedly engaged within the casing above the lower chamber 14 and defines an upwardly diverging valve seat 18 upon which a depending valve member 20 is seated when the valve is in the closed position. This valve member 20 is secured to the main body portion 22 of the piston valve member by means of a screw 21. However, a resilient bushing 24 is interposed between the valve plate 20 and the piston 22, around which three expansion type rings 25 are disposed for sliding engagement within the casing 12.

The piston 22 is further provided with a longitudinal slot 28 that receives a guide pin 27 which is fixed within the casing 12. This pin 27 prevents rotation of the piston 22 within the casing and confines it to reciprocating longitudinal movement therewithin. The piston 22 is further provided with an internal thread 29 that threadedly receives a threaded stud 31 that is rotatably carried by the top closure member 35 and is secured to a manually operable handle 34. Thus, in response to rotation of the handle 34, the threaded stud 31 is operative to effect longitudinal movement of the piston 22 between a closed position with respect to the outlet 32 and an open position relative thereto in which fluid can pass directly through the casing from the inlet 13 to the outlet 32.

The top closure 35 is also provided with a depending seat member 36 that is adapted to be received within a recess 37 in the top of the piston 22 when the piston has been moved to the completely open position. The valve as shown in Figure 1 is particularly useful for high pressure operation. However, by removing the seat plate 17 by means of a spanner tool that is engageable with suitably spaced openings 38 in the seat plate 17, this plate can be removed to provide a larger passageway between the inlet 13 and outlet 32 when the piston is in the open position. It will be noted that all of the parts are readily removable and accessible so as to facilitate the proper maintenance and servicing of the valve assembly. Because of the adjustable feature, this valve assembly may be adjusted for use with different types of steam, gas, air, water, and soil systems, thus increasing the utility thereof.

While various changes may be made in the detail construction, it shall be understood that such changes shall be within the spirit and scope of the present invention as defined by the appended claim.

What we claim as new and desire to protect by Letters Patent of the United States is:

A valve which comprises, in combination, a main valve casing having a vertical central cylindrical bore and an inlet into said bore and an outlet from said bore, said bore at its upper end portion having an internal diameter less than the internal diameter of the lower end portion of said bore; a removable valve seat plate threaded into the lower end of said upper bore portion having a centrally positioned valve seat, the lower end portion of said bore below said seat plate providing a lower chamber into which said inlet leads, the upper end portion of said bore above said seat plate providing an upper chamber from which said outlet leads; a valve piston member mounted for up and down movement in said upper chamber, said piston member comprising an upper cylindrical portion and a valve plug portion adjustably secured to the lower end of said cylindrical portion, a cup-shaped resilient bushing mounted on the lower end of said cylindrical portion between said valve plug portion and said cylindrical portion, a plurality of metal split rings mounted one above the other on said cup-shaped resilient bushing and above said valve plug portion, with the outer cylindrical surfaces of said split rings slidably engaging the inner cylindrical surface of said upper chamber above said seat plate member, said upper cylindrical portion of said piston member having a vertically extending, centrally positioned coarse threaded bore in its upper end and a vertical groove on its outer cylindrical surface; a removable top closure threaded on to the upper end of said main casing and having a central opening; a coarse threaded stem extending through said central opening and mounted for rotation in said coarse threaded bore for moving said valve piston downwardly to seat said plug on the seat in said seat plate to close said valve in response to rotation of said stem in one angular direction and to move said valve piston upwardly to unseat said plug and open said valve in response to rotation of said stem in the opposite angular direction, said resilient bushing being compressed when said plug is screwed tightly on said seat and exerting forces radially outward on said split rings to force the outer surfaces of said split rings into tighter engagement with the internal surface of said upper chamber; and a pin member mounted in said main casing and extending into said groove to prevent rotation of said piston member.

(References on following page)

References Cited in the file of this patent

UNITED STATES PATENTS

| | | |
|---|---|---|
| 75,670 | Douglas | Mar. 17, 1868 |
| 855,350 | Singmaster | May 28, 1907 |
| 952,508 | Caldwell | Mar. 22, 1910 |
| 1,304,409 | Thompson | May 20, 1919 |
| 1,495,403 | Davis | May 27, 1924 |
| 1,510,528 | Sebenste | Oct. 7, 1924 |
| 1,781,224 | Gilg | Nov. 11, 1930 |
| 2,229,871 | Penick | Jan. 28, 1941 |